United States Patent [19]
Colens

[11] Patent Number: 5,869,910
[45] Date of Patent: Feb. 9, 1999

[54] POWER SUPPLY SYSTEM FOR SELF-CONTAINED MOBILE ROBOTS

[76] Inventor: André Colens, rue du Baillois 5, Rixensart, Belgium, B-1330

[21] Appl. No.: 693,039
[22] PCT Filed: Feb. 10, 1995
[86] PCT No.: PCT/BE95/00013
§ 371 Date: Jul. 29, 1997
§ 102(e) Date: Jul. 29, 1997
[87] PCT Pub. No.: WO95/22191
PCT Pub. Date: Aug. 17, 1995

[30] Foreign Application Priority Data
Feb. 11, 1994 [BE] Belgium .................................. 9400171

[51] Int. Cl.$^6$ .................................. H02J 7/00; B25J 5/00
[52] U.S. Cl. ......................... 307/104; 364/478.06; 901/1; 701/200
[58] Field of Search ....................... 307/104; 340/310.07, 340/854.8; 439/950; 336/DIG. 2; 455/41; 364/423.098, 424.027, 478.06, 424.032, 443, 447, 449.4; 901/1; 701/23, 1, 27, 200, 205, 210; 318/568.12; 56/10.2 R

[56] References Cited

U.S. PATENT DOCUMENTS

| | | | |
|---|---|---|---|
| 4,777,416 | 10/1988 | George, II et al. | 318/568.12 |
| 4,777,785 | 10/1988 | Rafaels | 56/10.2 R |
| 5,258,755 | 11/1993 | Kuckles | 340/853.5 |
| 5,341,083 | 8/1994 | Klontz et al. | 336/DIG. 2 |
| 5,434,493 | 7/1995 | Woody et al. | 336/DIG. 2 |
| 5,554,914 | 9/1996 | Miyazawa | 318/568.12 |
| 5,610,488 | 3/1997 | Miyazawa | 318/568.12 |

*Primary Examiner*—Richard T. Elms
*Attorney, Agent, or Firm*—Leonard Bloom

[57] ABSTRACT

A system for resupplying power to self-contained mobile equipment, including a fixed station having an external power source and consisting of a high-frequency generator and an induction coil as well as, on or in the equipment, a pick-up coil, a current filtering and rectifying device, a rechargeable battery pack, and a microcomputer-controlled tracking system. The microcomputer is connected to the drive control system of the equipment and applies a drive algorithm to the fixed station when the battery charge level drops below a predetermined level, the algorithm being based on a measurement of the high-frequency generator signal reception strength gradient.

7 Claims, 3 Drawing Sheets

POWER SUPPLY SYSTEM FOR SELF-CONTAINED MOBILE ROBOTS

BACKGROUND OF THE INVENTION

The present invention is directed to an arrangement, a positioning and an energy supply system for self-contained mobile robots.

In order for a mobile robot to be completely autonomous, it is necessary for the robot to be supplied by an energy source without any external intervention.

A solution to this problem, only available if the robot is operative outdoors, is to use the ambient light which is converted into electricity by means of photovoltaic cells located on the illuminated surface of the device. The electricity so produced may be used immediately or may be stored in a rechargeable battery. This will free the robot from the energy supply constraint.

The photovoltaic cell system will limit the use of the robot to operations requiring a low power consumption and to a use in the open air which will make it dependent on the sunshine conditions. Other solutions have been contemplated in the context of the automatic re-filling of fuel reservoirs for internal combustion engine devices. The automatic connection to an electric network for the recharge of a battery of a device with an electric motor has also been contemplated.

These solutions require a precise positioning of the robot and a physical connection to the recharging or refuelling system.

The localisation by the robot of the point of re-supplying requires also a relatively complicated guiding system, for example by means of electric wires.

U.S. Pat. No. 4,777,416 discloses an autonomous mobile robot able to automatically join a resupplying station when the level of a rechargeable battery drops below a predetermined value. The positioning of such robot is however determined at all times and the motion in direction of the recharge station is effected according to a predetermined path. Such a system is complicated and requires frequent positioning calibrations. Moreover, in this document, a physical connection is required for the recharging operation, more particularly by means of a retractable arm.

The object of the invention is to overcome these difficulties and disadvantages.

According to the invention, a mobile self-contained robot is provided, able to re-supply itself with energy without having to physically be connected to a re-supplying source, without a precise positioning and with the use of the source itself as part of a positioning and guiding system for the resupplying in energy.

In normal operation, the robot moves in its working zone whose limits, for example determined by obstacles or a metallic wire, are detected in a known manner by appropriated sensors located on or in the robot.

SUMMARY OF THE INVENTION

According to the invention, the mobile and autonomous; robot is fitted with a computer and a circuit measuring the intensity of an oscillating field produced by the energy source itself. The intensity measurements are sent to a computer which applies a particular algorithm, in order to provide the necessary instructions to the organs controlling the movement of the device. On the basis of the intensity variation along its path, the robot, according to the invention, is able to lead itself to the supplying source if a power recharge is needed.

The supply system comprises a fixed or essentially fixed station with a generator of alternative current connected on one side to an electric current source, for example the public network at 220V or an unit made of photovoltaic panels coupled to a rechargeable battery, and on the other side to an induction coil located on or in the ground. This generator may operate permanently with a very weak loss if no source of induced current, for example in the form of a metallic mass, is located nearby. The frequency may vary from 5 to 100 KHz, preferably from 10 to 30 KHz, for example 20 KHz. The diameter of the induction coil varies from 5 to 100 cm, more typically from 10 to 20 cm.

Besides this, the robot is equipped with a pick-up coil tuned on the frequency of the alternative current of the fixed supplying system.

The robot is provided with an induced current filtering and rectifying device. The latter current comes from the pick-up coil and the device allows the recharge of a battery. These devices are well known.

When the recharging operation is over, the algorithm for performing the work specific to the robot will take over the operation until a new exhaustion of the rechargeable battery is detected.

The system according to the invention may be applied in several ways.

According to a first embodiment, the plane of the induction coil is perpendicular with respect to the plane of movement of the device.

The pick-up coil is located at the front of the mobile device. The axis of the coil is located on the axis of movement of the device.

The device comprises a computer which analyses, among other things, the level of charge parameters of a rechargeable battery, for example a Ni/Cd battery 12 V, 2 A/h. When the latter must be resupplied, for example when the charge is 30% the nominal value (less than, 600 mA/h), a particular algorithm takes the control of the movements of the device.

According to the algorithm, the device operates a 360° rotation on itself. The voltage of the pick up coil will pass by a maximum when the axis or the device and of the coil will be directed towards the induction generator.

The device will move according to this axis, randomly either in the direction of the source or in the opposite direction. In the latter case, the detected gradient is negative and the algorithm will foresee a 180° rotation that will lead inevitably the device on the right track in order to approach the emitting source which is also the energy supplying source.

The signal coming from the pick-up coil is constantly analysed by the computer located in the device. The computer controls the driving wheels, in such a way as to direct the device towards the generator, on the basis of the gradient of the emitted signal. The device will stop when the received signal is sufficient in order to permit the recharge of the battery.

According to a second embodiment of the invention, the plane of the induction coil is parallel to the plane of movement of the device. The induction coil may be put on the ground or placed under the surface of movement, preferably in a location far from obstacles that may be present on the surface of movement of the device.

The pick-up coil is placed under the mobile device in the plane of movement, preferably as close as possible to the ground (a few centimeters). When the device is moving in direction of the generator, the machine will cut the equipotential lines of the emission perpendicular to the latter and the field will increase, even more so as the machine approaches the generator. If the direction is not perpendicular to the equipotential lines, the gradient will inevitably decrease at a given time.

When the device moves parallel to the equal intensity lines, the field is practically constant, the intensity of the small possible variations being less than the background signals. The computer analyses the absolute value of the field and its gradient in respect of the progress of the device. The computer may direct the device to the generator and stop it when the field intensity is at its maximum.

So, the device being in movement, when the measured field at given intervals of time is practically constant (gradient less than a predetermined value), the algorithm will cause a 90° rotation of the device towards one or the other side. If the measured gradient is negative, the device will operate a second rotation, this time of 180°. The gradient is then positive up to a predetermined maximum where the generator is located, or to a minimum (constant value) when it is tangent to a line of force. This second case will happen more frequently due to the lack of precision of the measurements of the field, and to a lesser extent to the lack of precision of the performed rotations or of the path being followed. In this case, a new rotation of 90° is effected and the cycle may start again until a new predetermined value appears. In practice, the device reaches the resupplying station by successive approximations.

In the aforementioned embodiments, the algorithm takes into account other factors such as the signals for the limits etc. which will have a priority status on the simplified algorithm described above.

According to a particularly advantageous variation of the invention, the device is not located constantly in the zone of influence of the energy source. The latter, in most cases, is limited in practice to a distance of 10 to 30 meters, typically around 20 meters. The working area or zone may advantageously be more extended. When the device is located outside the zone of influence of the field emitted by the energy source, that is to say when the limits of the working area are situated outside the zone of influence, an appropriated algorithm will take over in case a recharging operation is necessary. The device will then move in a random way in search of the zone of influence, while possibly limiting its consumption to what is strictly necessary for its movement. In that way, in the case of a lawnmower, the device will travel through the working area until it enters the zone of influence of the energy source, such an event triggering the algorithm of approach as described above.

During the stage of searching for the zone of influence, the motor for the cutting operation will not operate in order to save energy and insure in that way an optimal autonomy for the device. The minimum level of charge for triggering the search process with the random search algorithm is chosen in order that, statistically, the device will find the zone of influence of the energy source before complete exhaustion of its rechargeable battery. The degree of certainty may be controlled according to the type of work given to the device.

During the searching stage, in order to obtain a optimal transfer of power between the emitting coil and the pick-up coil, the exact positioning of the mobile device with respect to the induction supplying system will be based on two measurements :

a measurement of the induced field A1 (square root of the measure of the induced fields) in the pick-up coil as effected by means of a selective circuit, of high gain, centered on the oscillation frequency of the supplying circuit permitting the measurement of the signal at long distance (several tens of meters)

a measurement of the charging current A2 supplied by the pick-up coil.

The charging current is measurable only when both coils are very close that is to say when the mismatch of one in respect of the other does not exceed their diameter.

The device's computer will take into account a combination of A1 and of A2 in order to estimate the absolute value of the field A=A1+A2.

The combination of both values allows a long distance detection together with a precise positioning for the superposition of both coils.

The field gradient, that is to say the variation on a certain distance, is inversely proportional to the square of the distance separating the mobile device and the supplying source.

To offer a uniform resolution, whatever the distance of the engine to the supplying source, the measurements of the field are effected at distance intervals whose lengths are proportional to the distance separating the device from the source. For example if

| A = 10  | d = 1 m   | (far from the source, around 10 meters) |
| A = 100 | d = 10 cm | (near the source, around 1 meter) |
| A = 350 | d = 3 cm  | (both coils are partially superposed, with an offset). |

The aforementioned system may be advantageously applied to an autonomous robotic lawnmower. All guiding elements not associated with the electric recharge may be identical to the ones described in the patent application PCT/BE91/00068 which is more particularly directed to a solar lawnmower and which the content thereof is incorporated herein by reference. The frequency used for the limit detection system will be sufficiently different from the one use for the induction recharge.

Advantageously the limit detector is deactivated once a certain level of induced field is measured, that is to say once the device is within a certain distance from the recharge unit.

In the case of a lawnmower, it is well understood that the algorithm will be designed in order to be adapted to complex configurations of the limits of the lawn with respect to the fixed station. Thus, it may be that the robot is separated from the fixed station by a zone which is not a part of its authorized working area. The limit detector will have a priority on the approach process towards the fixed station. In this case there may be provided that the robot will follow the limit, effecting at regular intervals positioning tests, until a moment is reached where the path to the fixed station is no more cut by a working area limit.

Still in the case of a lawnmower, the horizontal pick-up coil may be located under the cutting disk, in order to be as close as possible to the emitting coil during the recharging operation, improving in that way the efficiency of this operation.

The invention may be applied in the same advantageous way to a diversity of domestic or industrial robots for example vacuum-cleaner robots, monitoring robots or handling robots. A robotic monitoring device: may comprise for example a smoke detector and/or acoustic sensors.

Under certain circumstances, for example, on an industrial site, it may be advantageous to add a positioning system using a infra-red transmitter-receiver for particular positioning of the device. This may be the case if the ground is too interfering with respect of the induced field, for example if there is a steel armature. A multidirectional IR transmitter of appropriate power, for example of a range up to 50 meters, may in that way be provided at or near the recharge station, the corresponding receiver being mounted on the device. These associated transmitters and receivers are well known.

The system according to the invention allows the automatic recharge of autonomous devices in the power range of a few watts to several kilowatts.

BRIEF DESCRIPTION OF THE DRAWINGS

The invention will be better understood with reference to the annexed drawings given as way of example only in which.

DESCRIPTION OF THE PREFERRED EMBODIMENTS

Figure 1:
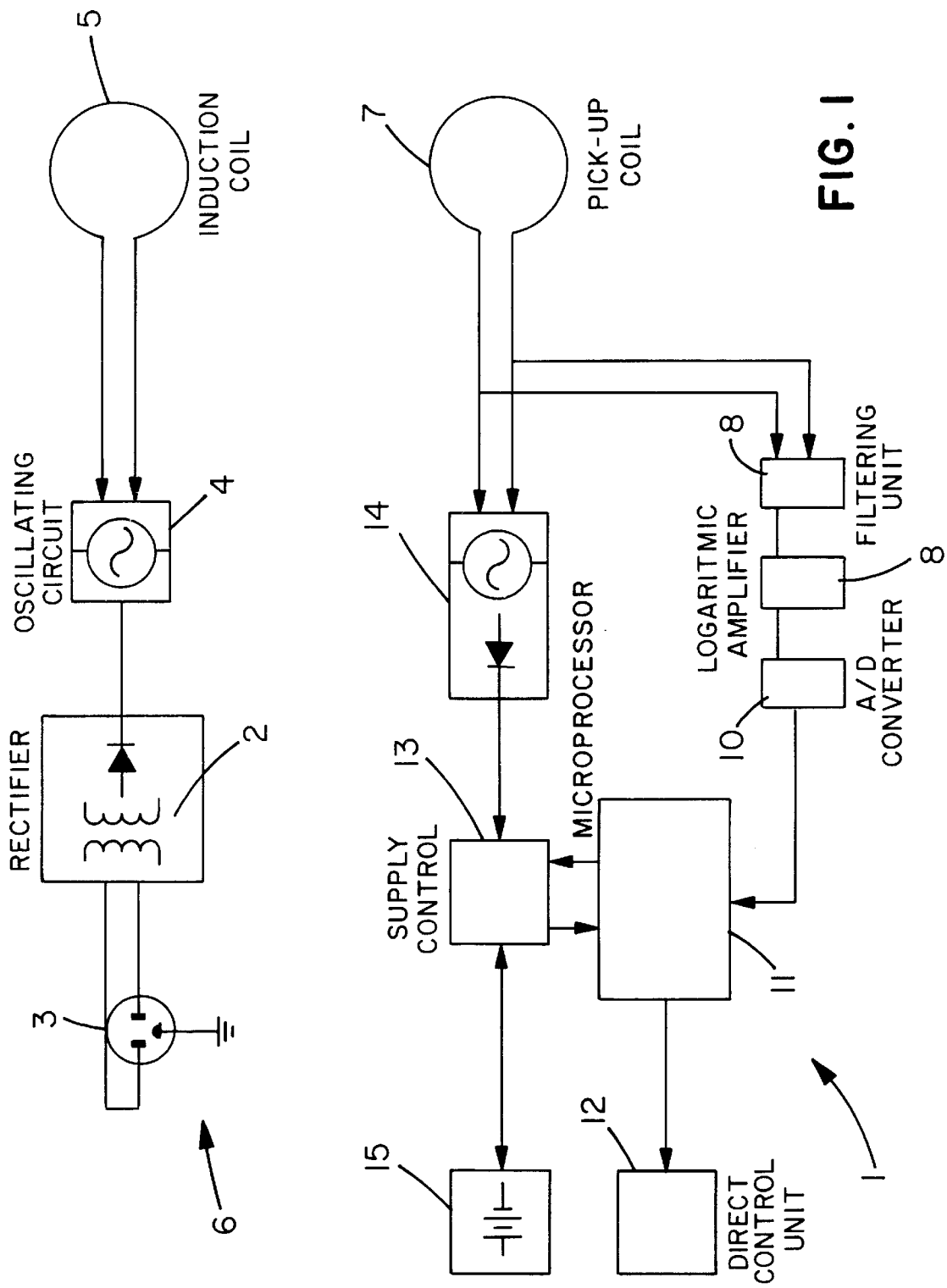
FIG. 1 shows the circuit for the fixed supplying station and the complementary circuit of the mobile device.

FIG. 1 is a schematic planar view illustrating on one side the fixed station 1 and on the other side the autonomous robot 6. The fixed station 1 comprises a rectifier 2 connected to the main network 3 at 220V. The continuous current supplies an oscillating circuit 4 of 20 KHz connected to an induction coil 5 located a few centimeters under the ground.

The autonomous robot 6 comprises a pick-up coil 7, the pick-up circuit comprising itself a filtering unit 8, a logarithmic amplifier 9 and an analog to digital converter 10, connected to a microprocessor 11. The microprocessor is itself connected to a direction control unit 12 and the supply control 13 is connected to the pick-up coil on one side and to the battery 15 on the other side in order to recharge the latter.

Figure 2:
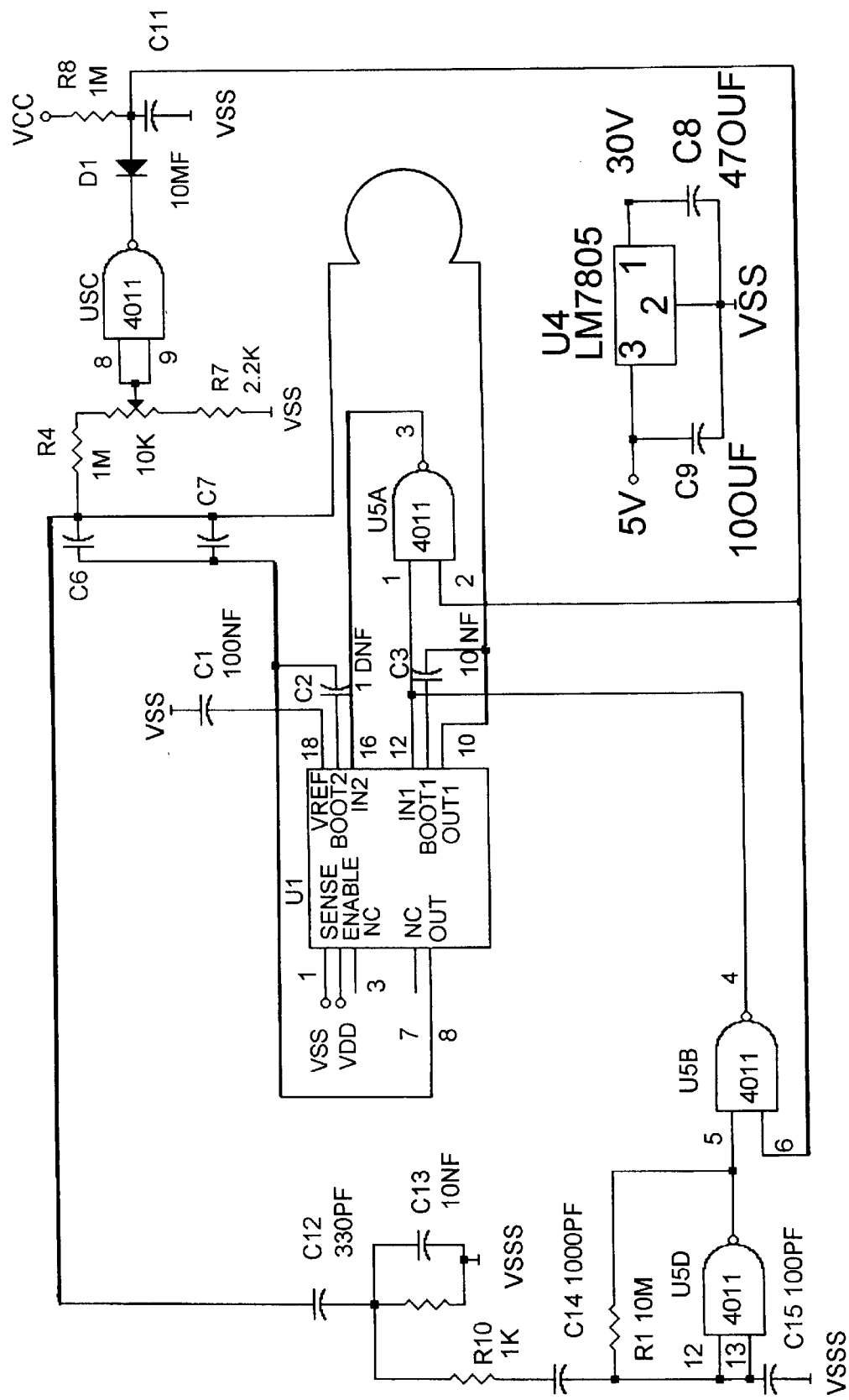
FIG. 2 is a schematic electronic diagram illustrating an oscillating circuit-transmitter such as the one used according to the arrangement of FIG. 1.

FIG. 2 represents schematically an example for the oscillating circuit- transmitter according to the second embodiment. In this particular case, the frequency c)f the oscillator is 25 KHz, the diameter of the coil is 20 cm, the number of turns of the coil of the fixed station is 70 (diameter of the wire is 0,8 mm), the number of turns for the mobile station is 14. The distance between the coils during the charging operation is 4 cm. The charging current is 750 mA (corresponding to an average recharging time for a battery of 12V, of 1 to 2 hours). The charging voltage is then 13,5 V.

Figure 3:
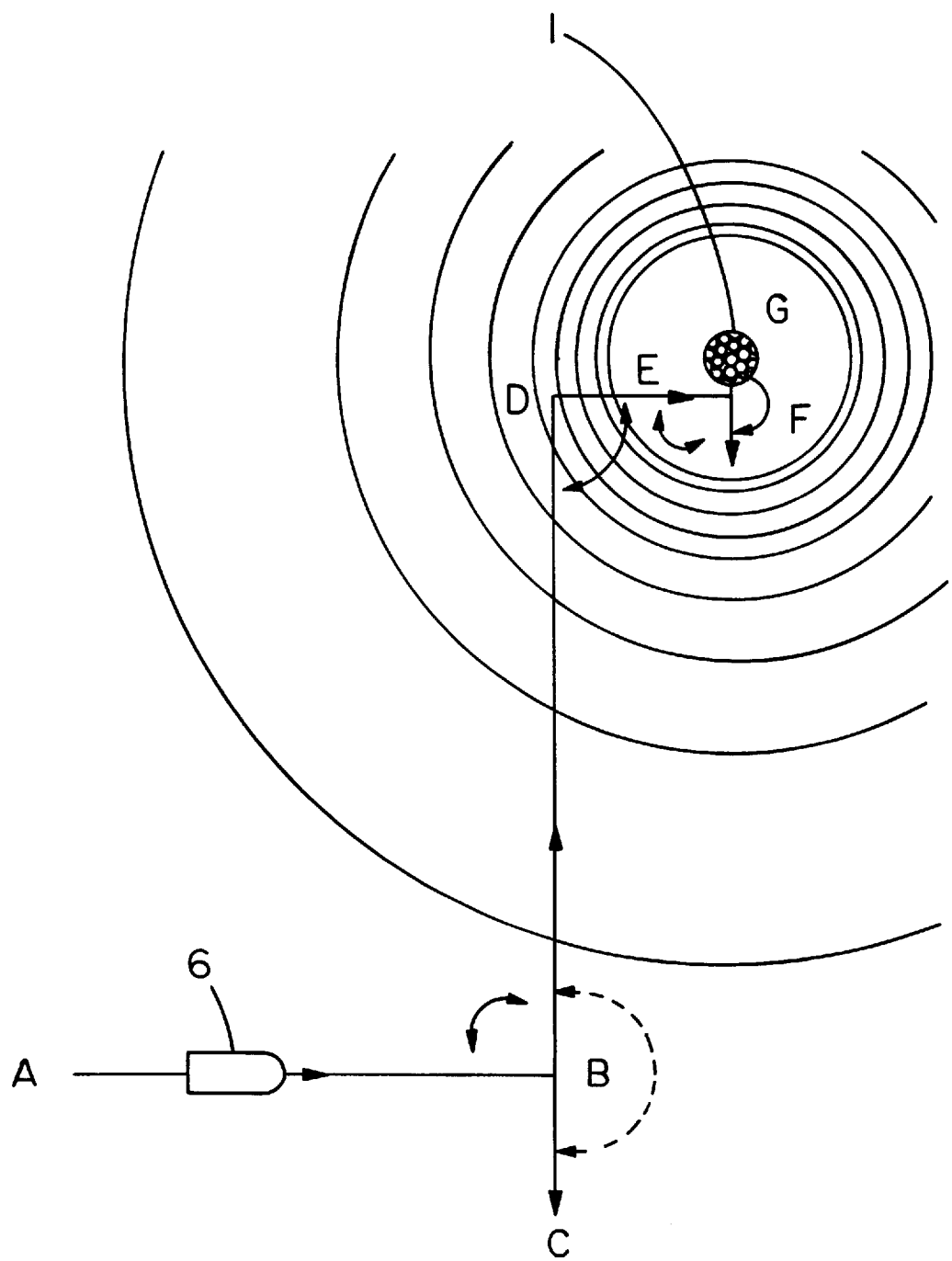
FIG. 3 illustrates the positioning algorithm as used in the second embodiment according to the invention.

FIG. 3 is a top-plan view which illustrates the circles of equal field intensity and the algorithm followed by the autonomous robot in order to join the fixed station. In this example, the robot will reach the charging position after three 90° turnings, with two corrections of 180° when the direction followed is opposite to the one leading to the position of supply. The path being followed passes through points A,B,C,B,D,E,F,E before arriving to the recharge station G.

The invention is not limited to the above mentioned embodiments which besides may vary in their details and constructions.

I claim:

1. System for resupplying power to a mobile self-contained device comprising:
   an essentially fixed station supplied by an external source;
   on or in the device, a rechargeable battery and a positioning system controlled by a microcomputer;
   the microcomputer connected to drive the positioning system of the device in the direction of the fixed station when the battery charge level drops below a predetermined level,
   wherein:
      the essentially fixed station comprises a high frequency generator and an induction coil producing a gradient of intensity of high frequency signals,
      a pick-up coil and a current rectifying device are incorporated on or in the device for recharging the rechargeable battery by induction;
      the microcomputer connected to drive the positioning system of the device in direction of the fixed station, applies an algorithm partially or totally based on the measurement of the gradient of the intensity of received high frequency signals from said generator.

2. System according to claim 1, wherein the induction coil of the fixed station and the pick-up coil of the device are both perpendicular to the plane of motion of the device.

3. System according to claim 1, wherein the induction coil of the fixed station and the pick-up coil are both parallel to the plane of motion of the device.

4. System according to claim 1, wherein the induction coil of the fixed station and the pick-up coil of the mobile device are both essentially parallel to the plane of motion of the device, the induction coil being located at the level of or under the ground.

5. System according to claim 1, wherein the induction coil of the fixed station and the pick-up coil of the mobile device are both essentially parallel to the plane of motion of the device, and wherein the microcomputer, by means of a drive control system, instructs a 90° rotation of the device when the field gradient drops below a predetermined value and a rotation of 180° of the device when the field gradient is negative.

6. Autonomous robot associated with a power recharge system comprising:
   an essentially fixed station supplied by an external source;
   on or in the robot, a rechargeable battery and a positioning system controlled by a microcomputer;
   the microcomputer connected to drive the positioning system of the robot in the direction of the fixed station when the battery charge level drops below a predetermined level, wherein
   the essentially fixed station comprises a high frequency generator and an induction coil;
   a pick-up coil and a current rectifying device are incorporated on or in the device;
   the microcomputer connected to the positioning system of the device in direction of the fixed station, applies an algorithm partially or totally based on the measurement of the gradient of the intensity of received high frequency signals from said generator.

7. Robot according to claim 6, wherein the robot is a lawnmower, a surface cleaning device or a handling device.

* * * * *